(12) United States Patent
Garrison et al.

(10) Patent No.: US 11,687,145 B2
(45) Date of Patent: Jun. 27, 2023

(54) DELIVERING POWER TO PRINTING FUNCTIONS

(71) Applicant: Hewlett-Packard Development Company, L.P., Spring, TX (US)

(72) Inventors: Joseph L Garrison, Vancouver, WA (US); Jason M Quintana, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 519 days.

(21) Appl. No.: 16/500,509

(22) PCT Filed: Apr. 10, 2017

(86) PCT No.: PCT/US2017/026760
§ 371 (c)(1),
(2) Date: Oct. 3, 2019

(87) PCT Pub. No.: WO2018/190785
PCT Pub. Date: Oct. 18, 2018

(65) Prior Publication Data
US 2020/0057483 A1    Feb. 20, 2020

(51) Int. Cl.
*G06F 1/32* (2019.01)
*G06F 3/12* (2006.01)
*G05F 5/00* (2006.01)
*B41J 29/393* (2006.01)
*G06F 1/3234* (2019.01)

(52) U.S. Cl.
CPC .......... *G06F 1/3284* (2013.01); *B41J 29/393* (2013.01); *G05F 5/00* (2013.01); *G06F 3/1221* (2013.01)

(58) Field of Classification Search
CPC . G06F 1/3284; G06F 1/3212; H04N 1/00896; H04N 1/00885; H04N 1/00904
See application file for complete search history.

(56) References Cited

U.S. PATENT DOCUMENTS

| 5,483,656 | A | 1/1996 | Oprescu et al. |
| 5,560,022 | A | 9/1996 | Dunstan et al. |
| 6,393,233 | B1 | 5/2002 | Soulier |
| 6,526,516 | B1* | 2/2003 | Ishikawa ................. G06F 1/189 348/207.2 |
| 7,360,100 | B2 | 4/2008 | Allred et al. |
| 7,519,837 | B2 | 4/2009 | Smith et al. |
| 10,261,564 | B1* | 4/2019 | Gollakota ............. G06F 9/4451 |

(Continued)

OTHER PUBLICATIONS

Gingade, G. et al., Hybrid Power Management for Office Equipment, Nov. 2016,http://dl.acm.org/—22 pages.

*Primary Examiner* — Jaweed A Abbaszadeh
*Assistant Examiner* — Cheri L Harrington
(74) *Attorney, Agent, or Firm* — Brooks, Cameron & Huebsch, PLLC (57) ABSTRACT

A power management technique for a printer includes detecting a change in a state of operation of a printing device. The amount of power available to operate all functions of the printing device is calculated. Next, power is delivered to specified functions of the printing device based on the calculated amount of power available, wherein the specified functions are a subset of all functions of the printing device. Then, it is determined whether the specified functions operate correctly.

16 Claims, 5 Drawing Sheets

(56) References Cited

U.S. PATENT DOCUMENTS

| | | | |
|---|---|---|---|
| 2006/0005057 A1* | 1/2006 | Nalawadi | G06F 1/3203 |
| | | | 713/320 |
| 2008/0204460 A1* | 8/2008 | Marinkovic | G06F 3/14 |
| | | | 345/502 |
| 2009/0313484 A1* | 12/2009 | Millet | G06F 1/30 |
| | | | 713/300 |
| 2012/0057894 A1 | 3/2012 | Tress et al. | |
| 2014/0067139 A1* | 3/2014 | Berke | G06F 1/26 |
| | | | 700/291 |
| 2016/0054780 A1* | 2/2016 | Bodas | G06F 1/324 |
| | | | 713/320 |
| 2018/0284865 A1* | 10/2018 | Shimamura | H04N 1/00904 |
| 2019/0065243 A1* | 2/2019 | Eckert | G06F 3/0659 |

* cited by examiner

| Mechanism ⌐54 | Maximum Power Requirement ⌐65 | Minimum Functional Power Requirement ⌐66 | Minimum Standby Power Requirement ⌐67 |
|---|---|---|---|
| 1. Printing | 8W | 2W | 0W |
| 2. Scanning | 4W | 1W | 0W |
| 3. Copying | 6W | 1W | 0W |
| 4. Faxing | 6W | 1W | 1W |
| 5. Audio | 5W | 2W | 1W |
| 6. Communication | 6W | 1W | 0W |
| 7. User Interface | 4W | 2W | 1W |
| 8. USB | 10W | 1W | 0W |
| 9. Print Head | 7W | 2W | 1W |
| 10. . | . | . | . |
| 11. . | . | . | . |
| 12. . | . | . | . |
| 13. . | . | . | . |
| 14. . | . | . | . |
| 15. . | . | . | . |
| 16. . | . | . | . |
| 17. . | . | . | . |

Ranking/Importance: High → Low

⌐150

… you are

DELIVERING POWER TO PRINTING FUNCTIONS

BACKGROUND

Various functions in a printer require different power allocations in order for those functions to operate correctly. For example, a print head requires certain power requirements to perform a print job in accordance with a user's expectation including the quality of the print out and the duration of the print job. However, the overall power available for the various functions performed by a printer are often less than the cumulative amount of power necessary to perform the individual functions.

DETAILED DESCRIPTION

With greater number of peripheral functions being added to printers, power management is becoming of greater importance, particularly with cost and mechanical constraint prohibitions associated with increased power supply capabilities. The examples described herein determine the amount of power necessary to perform certain functions in a printer, and allocates/re-allocates power based on the current and anticipated requirements of the printer.

Figure 1:
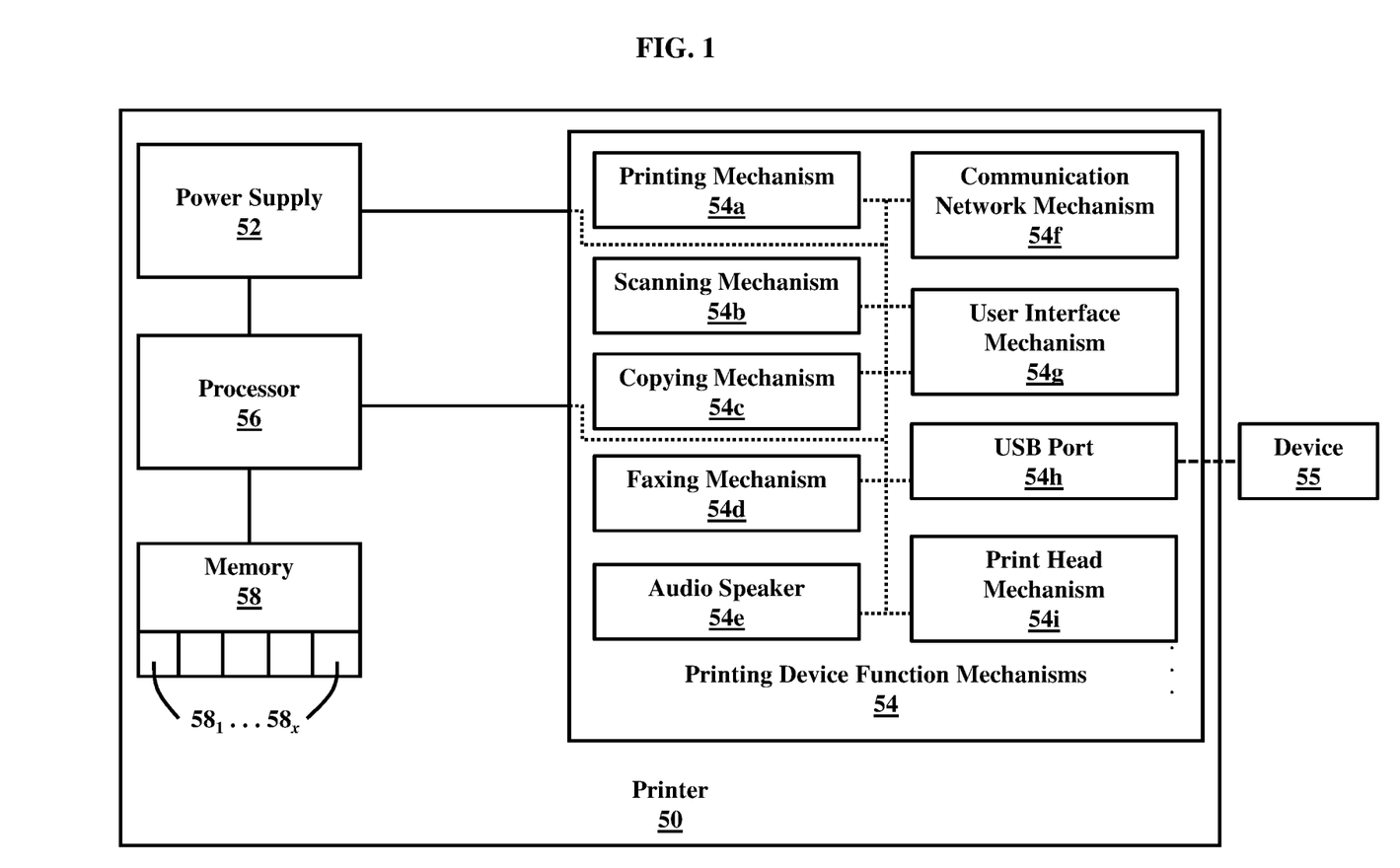
FIG. 1 is a block diagram of a printer, according to an example herein.

FIG. 1 illustrates an example of a printer 50, such as an inkjet, laser jet, 3D printer or any type of printing device, comprising a power supply 52, a plurality of printing device function mechanisms 54 operatively connected to the power supply 52, a processor 56 operatively connected to the power supply 52 and each of the plurality of printing device function mechanisms 54, and a memory 58. The processor 56 may be configured as an application specific integrated circuit processor (ASIC) and the memory 58 may be configured as random access memory (RAM) or read-only memory (ROM), for example, and may contain multiple memory elements $58_1, \ldots, 58_x$. The power supply 52, which may be configured as an alternative current (AC) power supply or a direct current (DC) power supply, has finite power limits including nominal power limits and higher, short-term peak power limits to accommodate rapid changes in power required by the plurality of printing device function mechanism 54. Peak power output occurs in time windows typically measured in milliseconds and affect print mechanism functions such as overlapping motor movements, stall conditions, firing speed, and capping, for example. Nominal power output effects how much power the particular device function mechanisms 54 draw including printer electronics and non-print mechanism functions. In an example, the power supply 52 may be rated for 15 W nominal power and 28 W peak power. The printer electronics typically draw approximately 3 W of power when idle, and the print mechanisms typically draw 28 W peak power.

The plurality of printing device function mechanisms 54 may comprise any of a printing mechanism 54a, a scanning mechanism 54b, a copying mechanism 54c, a faxing mechanism 54d, an audio speaker 54e, a communication network mechanism 54f such as Bluetooth™ audio and communication capabilities, a user interface mechanism 54g, a universal serial bus (USB) port 54h, and a print head mechanism 54i. Other printing device function mechanism typically found in, on, or connected to a printing device 50 may also be provided in various example configurations, although not shown for clarity of the drawings. The plurality of printing device function mechanisms 54 individually draw different levels of power from the power supply 52. In an example, a Bluetooth™ enabled audio speaker 54e and a USB port 54h used for engaging and/or charging a device 55 may collectively draw 11 W of power. Each of the plurality of printing device function mechanisms 54a-54i, for example, are directly or indirectly connected to the power supply 52 and the processor 56. Moreover, each of the plurality of printing device function mechanisms 54a-54i may be directly or indirectly connected to one another. In an example, the device 55 may comprise a flash drive or any other device with a USB connector.

Figure 2:
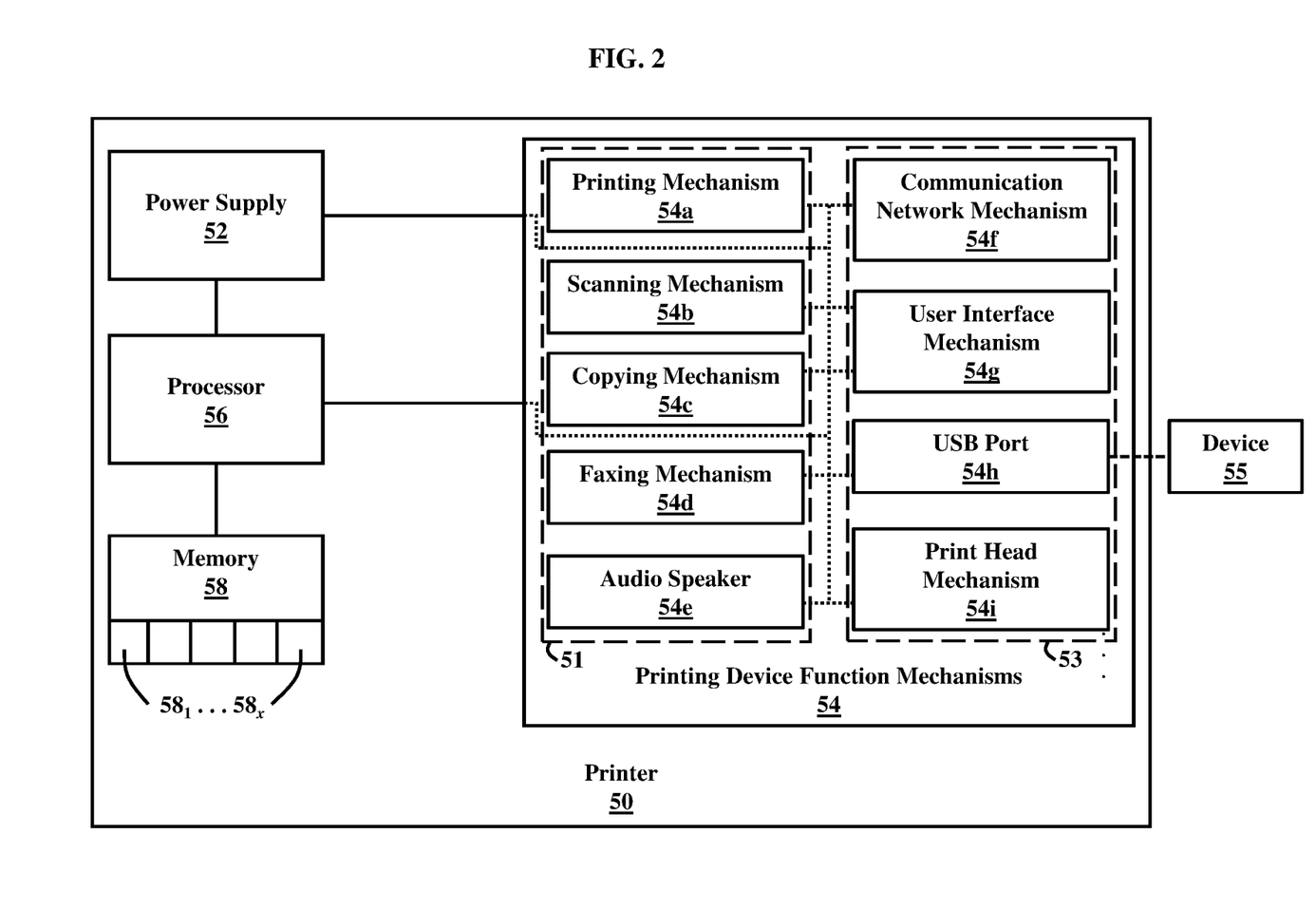
FIG. 2 is a block diagram of a printer, according to another example herein.

The memory 58 comprises instructions executable by the processor 56 to detect changes in operation between the plurality of printing device function mechanisms 54, determine an amount of power available in the power supply 52 to operate all of the plurality of printing device function mechanisms 54, and deliver power from the power supply 52 to specified printing device function mechanisms 51 based on the calculated amount of power available, wherein the specified printing device function mechanisms 51 are depicted in the example of FIG. 2, which shows mechanisms 54a-54e as the specified printing device function mechanism 51. Of course, the plurality of printing device function mechanisms 54a-54i may be grouped individually or in any combination to constitute the specified printing device function mechanisms 51. The processor 56 determines whether the printing device function mechanisms 54 and nominal power exceeds the peak power output envelope of the power supply 52 in order to prevent the power supply 52 from latching off. In an example, the specified printing device function mechanisms 51 are a subset of all the plurality of printing device function mechanisms 54. Again, in the example shown in FIG. 2, the specified printing device function mechanisms 51 include mechanisms 54a-54e.

In an example, the memory 58 may comprise instructions executable by the processor 56 to run a power management process to properly allocate the amount of power to be delivered to the plurality of printing device function mechanisms 54. The processor 56 receives feedback from the plurality of printing device function mechanisms 54 on their required power consumption in order to function properly and in accordance with a required level of performance. The processor 56 receives data from the plurality of printing device function mechanisms 54 that characterize the current state of operation of the individual mechanisms 54a-54i to determine a level of performance of the mechanisms 54. For example, the current state of operation for a particular mechanism may be on, off, idle, sleep mode, in use, active, passive, receiving instructions, among other states of operation. When high-powered tasks are required by the specified mechanisms 51, the processor 56 is able to suitably allocate power to those particulars mechanisms 51 requiring greater power thresholds, while de-allocating power to other mechanisms that are either operationally idle, require less power for proper functioning, or are not required to be using power while other mechanisms are drawing power. In the example of FIG. 2, mechanisms 53 are denoted as the de-allocated power mechanisms.

The memory 58 may comprise instructions executable by the processor 56 to detect whether the specified printing device function mechanisms 51 are operating in accordance with a predetermined required level of performance, and vary the delivery of power from the power supply 52 to the specified printing device function mechanisms 51 based on the detected level of performance of the specified printing device function mechanisms 51. Rather than completely disabling various printing device function mechanisms 53 before any high-power event occurs in an effort to avoid latching the power supply 52, the processor 56 determines which printing device function mechanisms 51 are required based on the current operation of the printer 50 and allocates power to the printing device function mechanisms 51 accordingly.

For example, the audio speaker 54e of the printer 50 may be outputting music for a user to hear while a print job is occurring, which requires the power supply 52 to deliver sufficient and simultaneous power to the printing mechanism 54a as well as the audio speaker 54e. If the printing mechanism 54a requires 2 W, for example, more power than the power supply 52 can deliver, and there is a device 55 sitting in the USB port 54h drawing 3 W, for example, and the audio speaker 54e is drawing 3 W, for example, then the processor 56 may determine to scale back the power to the USB port 54h by at least 2 W and reallocate this amount of power to the print mechanism 54a to allow the print mechanism 54a to perform its function in a suitable manner. While the power to the USB port 54h is reduced to 1 W, the speed of the function of the device 55 in the USB port 54h may be decreased. For example, if the device 55 is in the process of downloading a stored digital file from the printer 50 while the power to the USB port 54h is reduced to 1 W, then the download speed may be reduced. In this example, no change to the audio output of the speaker 54e occurs since no power reallocation to the speaker 54e has occurred. Once the print mechanism 54a has completed its task, which may involve completing a print job, then the processor 56 reallocates the 2 W of power back to the USB port 54h and the device 55 may function at its optimal level. From a user's perspective, both the print mechanism 54a and the USB port 54h have performed their intended functions without noticeable difference in the delivery of the functions.

The instructions may cause the processor 56 to detect whether the specified printing device function mechanisms 51 fail to operate in accordance with the required level of performance more than a predetermined number of times (N), and deliver power from the power supply 52 to the specified printing device function mechanisms 51 based on an amount of failed operation detections, as further described below.

In one example, the instructions may cause the processor 56 to reduce the delivery of power from the power supply 52 to the specified printing device function mechanisms 51 that are operating at the predetermined required level of performance. The power requirements within a particular function itself may also vary. For example, if the printing mechanism 54a is printing black-and-white text on printable media such as paper, at time $t_1$, and then within the same print job the printing mechanism 54a is instructed to print a multi-colored image at time $t_2$, then the power requirements at time $t_2$ are greater than the power requirements at time $t_1$, and as such the processor 56 may monitor the variance in the power requirements within the particular mechanism occurring within a particular function and send instructions to the power supply 52 to increase/decrease power to that particular mechanism accordingly.

In another example, the instructions may cause the processor 56 to increase the delivery of power from the power supply 52 to the specified printing device function mechanisms that are not operating at the predetermined required level of performance. Examples of reducing or increasing the power requirements to the specified printing device function mechanism include increase/decrease the USB charge current in the USB port 54h, increase/decrease the audio power limiter threshold of the audio speaker 54e, change the audio system tune to reduce a bass level, increase/decrease the audio output through the audio speaker 54e, increase/decrease the carriage speed and/or acceleration of the print head mechanism 54i, and increase/decrease the paper speed and/or acceleration of the printing mechanism 54a, among other actions.

In still another example, the instructions may cause the processor 56 to estimate power requirements for the plurality of printing device function mechanisms 54 based on previous power requirements for the plurality of printing device function mechanisms 54. Such an approach allows for machine learning attributes of the printer 50, which allow the processor 56 to estimate or anticipate power requirements of the plurality of printing device function mechanisms 54a-54i prior to use.

Figure 3:
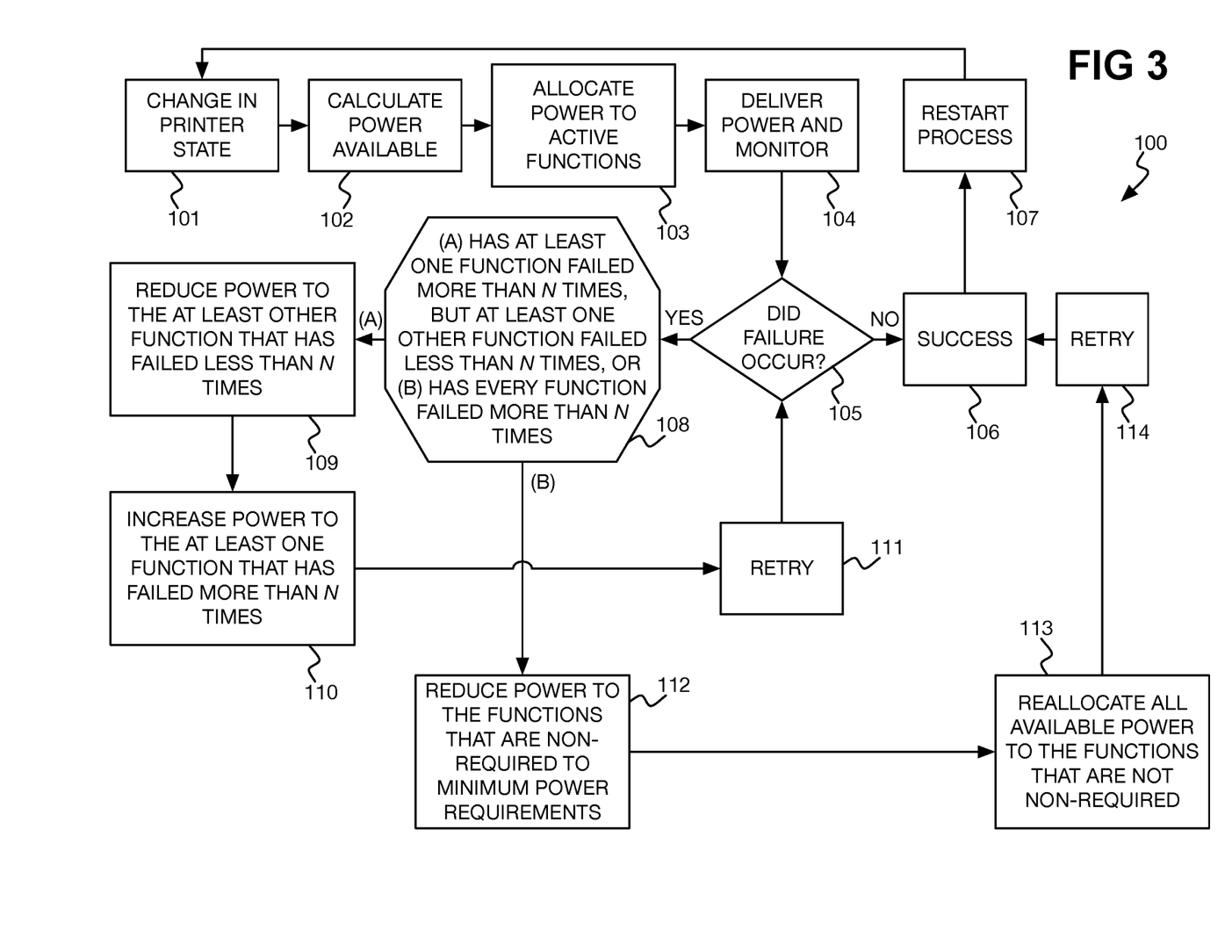
FIG. 3 is a flowchart illustrating a method, according to an example herein.
Figure 4:
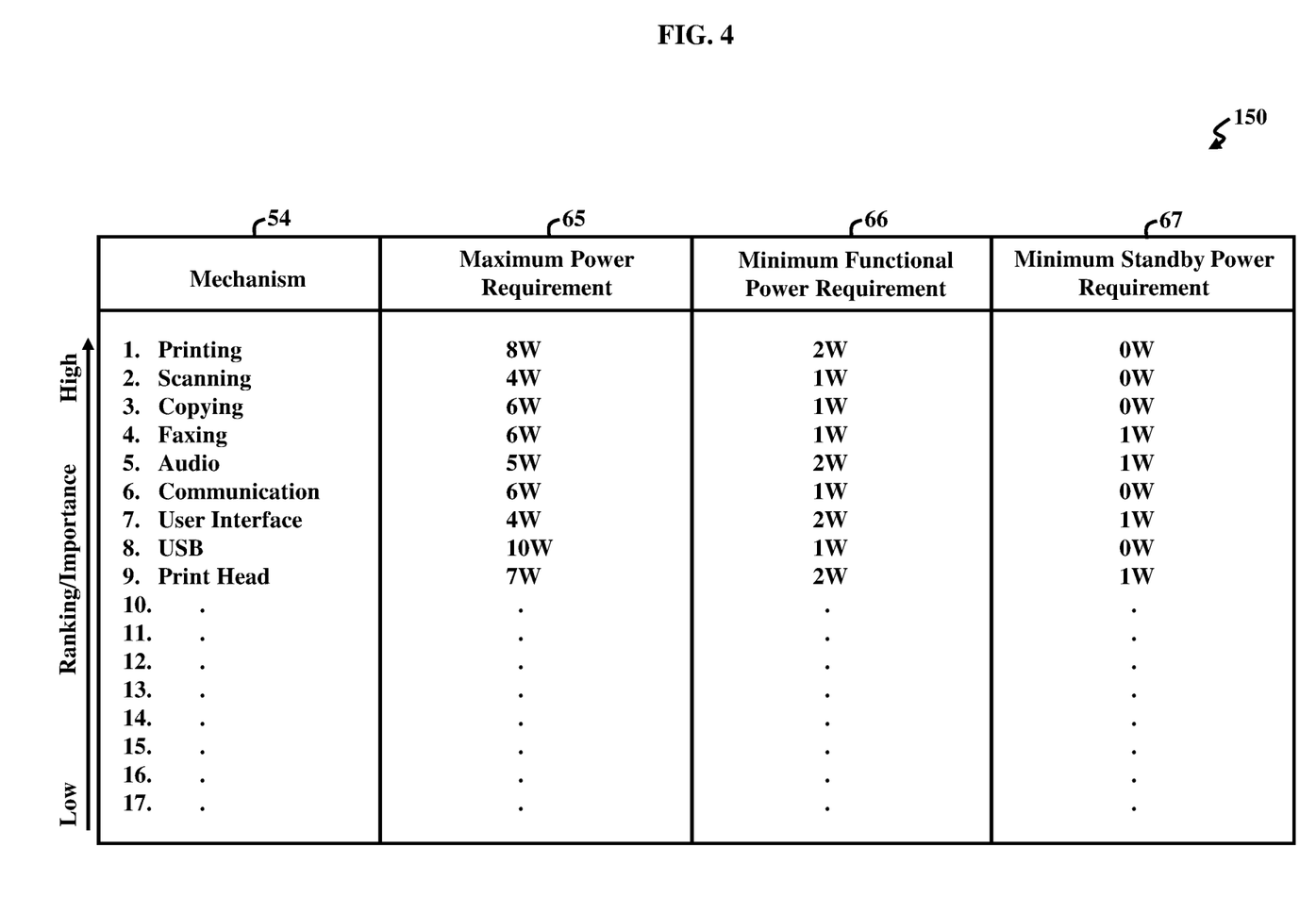
FIG. 4 illustrates a data table, according to an example herein.

FIG. 3, with reference to FIGS. 1 and 2, is a flowchart illustrating a method 100 according to an example herein. In block 101, the method 100 comprises detecting a change in a state of operation of a printer 50. For example, this may include detecting that the printer 50 has completed a print job and is now performing maintenance on the print heads, etc. Block 102 provides calculating an amount of power available to operate all functions 54a-54i of the printer 50. Here, the processor 56 communicates with each of the plurality of printing device function mechanisms 54 to assess their power requirements, and the processor 56 also communicates with the power supply 52 to assess the amount of power available. FIG. 4 illustrates a listing of the maximum power requirement 65, minimum functional power requirement 66, and minimum standby power requirement 67 associated with the corresponding mechanisms 54, and may be stored in a dynamic data table 150 in memory 58 or provided to the printer 50 through firmware updates. The maximum power requirement 65 may refer to the maximum amount of power that a particular mechanism 54 requires to perform its given function(s). The minimum functional power requirement 66 may refer to the lowest power that a particular mechanism 54 requires in order to perform its given functions(s), even at a baseline functionality level. The minimum standby power requirement 67 may refer to the amount of power a particular mechanism 54 requires even if its function(s) is not active. The dynamic data table 150 may be programmed to assign a ranking associated with the importance assigned to a particular function of the printer 50. This ranking may be updated as the printer 50 transitions from one state of operation to another such that, for example, the level of importance of delivering sufficient power to the printing mechanism 54a may have the highest ranking as the processor 56 detects that the printer 50 is preparing to perform a print job while the ranking for delivering power to the USB port 54h may be the near the bottom of the rankings as the processor 56 detects that the USB port 54h is empty, and the ranking for the print head mechanism 54i may be the lowest perhaps because the printer 50 has a scheduled maintenance to clean the print heads, etc. set for 7:00 PM, and the current time is only 2:00 PM, and thus the print head mechanism 54i may be idle and not require power at the current time. For example, after an initial state of operation of the printer 50, the USB port 54h may have a 10 W, 1 W, 0 W maximum power requirement 65, minimum functional power requirement 66, and minimum standby power requirement 67, respectively. When the dynamic data table 150 updates as the printer 50 transitions from one state of operation to another, then the power values associated with the particular mechanisms 54 may also change. For example, after a second state of operation of the printer 50, the communication network mechanism 54f may have a 6 W, 1 W, 0 W maximum power requirement 65, minimum functional power requirement 66, and minimum standby power requirement 67, respectively, and printing from the USB port 54h may have a 6 W, 1 W, 1 W maximum power requirement 65, minimum functional power requirement 66, and minimum standby power requirement 67, respectively, while audio from the audio speaker 54e is streaming from the internet, and as such may appear higher on the rankings in the dynamic data table 150.

In an example, in a default setting, the printing mechanism 54a always has the highest rank and is considered the most important function of the printer 50 since printing is often the primary function of a printer 50.

Next, in block 103 of FIG. 3, power is allocated to active functions of the printer 50. In this regard, the processor 56 reads the data table 150 to determine which of the printing device function mechanisms 54 is/are the highest rank for receiving their full requirement(s) of power and sends instructions to the power supply 52 to allocate sufficient power to the specified printing device function mechanisms 51; i.e., allocate the minimum functional power requirement 66 to the particular mechanisms 54. These specified printing device function mechanisms 51 are likely to be active functions of the printer 50. In other words, these specified functions 51 are likely to be currently in use or about to be in use. For example, the printer 50 may be outputting music through the audio speaker 54e and may be receiving instructions to perform a print job using the printing mechanism 54a. The audio speaker 54e and the printing mechanism 54a may be considered active functions of the printer 50 in this example. In block 103, no additional power has been delivered to the specified active function mechanisms 51; only the pre-existing power that was delivered to those specified active function mechanisms 51 based on a previous power delivery from the power supply 52 to those particular mechanisms is occurring.

In block 104, power is delivered from the power supply 52 to the specified function mechanisms 51 of the printer 50 based on the calculated amount of power available and the rankings indicated in the data table 150 as well as the corresponding power requirements of the specified function mechanisms 51 that are to receive power. The specified functions of mechanisms 51, which may be active functions, corresponding to the specified mechanisms are a subset of all functions of the printing device function mechanisms 54 of the printer 50. Accordingly, the number of specified functions and mechanisms 51 for which power is allocated is less than the overall number of all functions and mechanisms 54a-54i of the printing device function mechanisms 54. Furthermore, in block 104, the amount of power drawn by the specified function mechanisms 51 are also monitored by the processor 56. This allows the processor 56 to determine whether the specified function mechanisms 51 are receiving sufficient power to perform their respective functions, and how much power those specified function mechanisms 51 are actually using, which may be variable.

Next, block 105 provides for determining whether the specified functions of mechanism 51 operate correctly. In other words, block 105 determines whether a failure occurs in the functionality and performance of the specified function mechanisms 51 that are receiving power from the power supply 52. Such a determination can be a Yes/No inquiry such that if the specified function has met a threshold requirement regarding functionality and/or performance, then the processor 56 determines that no failure has occurred, No, and the power allocation is considered a success as indicated in block 106. In other words, the processor 56 identifies that each of the specified function mechanisms 51 requiring a certain amount of power is receiving sufficient power from the power supply 52 in order to perform the required functions correctly. If the specified functions 51 are operating correcting, then the printer 50 is deemed to be operating correctly for whatever particular task is required by a user, and the specified active function mechanisms 51 continue to operate for the duration required by the particular function. For example, if the printing mechanism 54a is being utilized to perform a print job, then the print job continues until it is completed. At this point, the process restarts as indicated in block 107 and the processor 56 once again detects whether a change in the state of operation of the printer 50 has occurred in block 101. For example, the processor 56 may determine whether the printing mechanism 54a has completed performing a print job and the printer 50 is now ready to begin performing a scanning process using scanning mechanism 54b.

Again with respect to block 105, if the processor 56 determines that the specified function has not met a threshold requirement regarding functionality and/or performance, then the processor 56 determines that a failure has occurred, Yes, and in block 108, the processor 56 detects whether the specified functions fail to operate correctly more than a predetermined number of times (N), which may be established by the power management process, and which may be revised based on the history of usage of the printer 50 and user requirements, among other reasons. Accordingly, the processor 56 determines how many failures have occurred with respect to the specified function. In block 108, if the processor 56 detects that the number of failures is less than the predetermined number of times (N), No, then the processor 56 instructs the power supply 52 to reduce the power to non-failing functions to either the minimum functional power requirement 66 or the minimum standby power requirement 67 for a particular mechanism 54, as indicated in block 109. This occurs because the processor 56 determines that the specified function mechanisms 51 are receiving adequate power from the power supply 52 in order to perform the specified function(s), and perhaps the specified function mechanisms 51 would be able to operate correctly even if the amount of power delivered to it is reduced to the minimum functional power requirement 66 or the minimum standby power requirement 67 for a particular mechanism 54, and as indicated in block 110, the power supply 52 may increase the power to a failing specified function mechanism by using the power that was reduced to non-failing functions in block 109. Accordingly, the processor 56 allocates the power available to the specified functions of the printer 50 in blocks 109 and 110 based on the number of failed operation detections determined in block 108. For example, in block 108 the processor 56 may determine whether the faxing mechanism 54d has failed to correctly transmit or receive a facsimile transmission and whether the communication network mechanism 54f has failed to correctly transmit a telephone call through a Bluetooth™ connection N number of times. If the processor 56 determines that the faxing mechanism 54d has not failed more than N number of times, but that the communication network mechanism 54f has failed more than N number of times by either dropping a call or having unclear reception/transmission of the sound through audio speaker 54e, then the processor may reduce the power delivered by the power supply 52 to the faxing mechanism 54d in block 109, and increase the power delivered by the power supply 52 to the audio speaker 54e and/or the communication network mechanism 54f in block 110. Thereafter, the processor 56 instructs the corresponding specified function mechanism 51 to retry performing its respective function(s) in block 111, which once again causes the processor 56 to determine whether a failure occurred in the specified function mechanism's performance of its function, as the method 100 again iteratively loops back to block 105. The failure determination in block 105 may repeat as long as the processor 56 detects failures in the performance of the specified function mechanism's performance. Alternatively, the processor 56 may only repeat the failure determination in block 105 a specific number of times, which may be pre-programmed as part of the power management process, for example. In this regard, if the processor 56 detects failures in the performance of the specified function mechanism's performance for the specific number of times and yet failures are still detected, then the process moves to block 112.

Again with respect to block 108, if the processor 56 determines that the specified functions have failed to operate correctly more than a predetermined number of times (N), Yes, then the processor 56 instructs all non-required functions of the printer 50 to turn to the minimum functional power requirement 66 or the minimum standby power requirement 67 for a particular mechanism 54, as indicated in block 112. This may occur in different ways. For example, the processor 56 may instruct the power supply 52 to stop delivering power to the non-required functions, or the processor 56 may directly instruct the non-required function mechanism to turn off thereby not consuming any additional power. For example, if the USB port 54h is empty, and the print head mechanism 54i is currently not performing any print head maintenance, then the processor 56 may either instruct the power supply 52 to stop sending any power to the USB port 54h and the print head mechanism 54i, or the processor 56 may directly communicate instructions to the USB port 54h and the print head mechanism 54i to turn off, enter a sleep or standby state of operation, and otherwise no longer utilize or consume power or utilize only a minimum standby amount of power.

Next, in block 113 the processor 56 re-allocates the power available to all specified functions of the printer 50 that fail to operate correctly more than the predetermined number of times (N). Here, the processor 56 may allocate all available power to the failing mechanisms, in order to reach the minimum functional power requirement 66 or minimum standby power requirement 67 for a particular mechanism 54, based on the power that is saved and/or not consumed by the non-required function mechanism(s) from block 112. In block 114, the processor 56 instructs the power supply 52 to re-deliver power to the specified functions of the printer 50 that fail to operate correctly more than the predetermined number of times (N), where generally, the processor 56 instructs the corresponding specified function mechanism 51 to retry performing its respective function(s) in block 114. If the specified function mechanism 51 successfully performs its function, then the power management and delivery process is considered a success in block 106 and the iterative process restarts in block 107, which once again causes the processor 56 to determine whether there has been a change in the state of operations of the printer 50 in block 101.

Various examples herein may include both hardware and software elements. The examples that are implemented in software include but are not limited to, firmware, resident software, microcode, etc. Other examples may comprise a computer program product configured to include a pre-configured set of instructions, which when performed, may result in actions as stated in conjunction with the methods described above. In an example, the pre-configured set of instructions may be stored on a tangible non-transitory computer readable medium or a program storage device containing software code.

Figure 5:
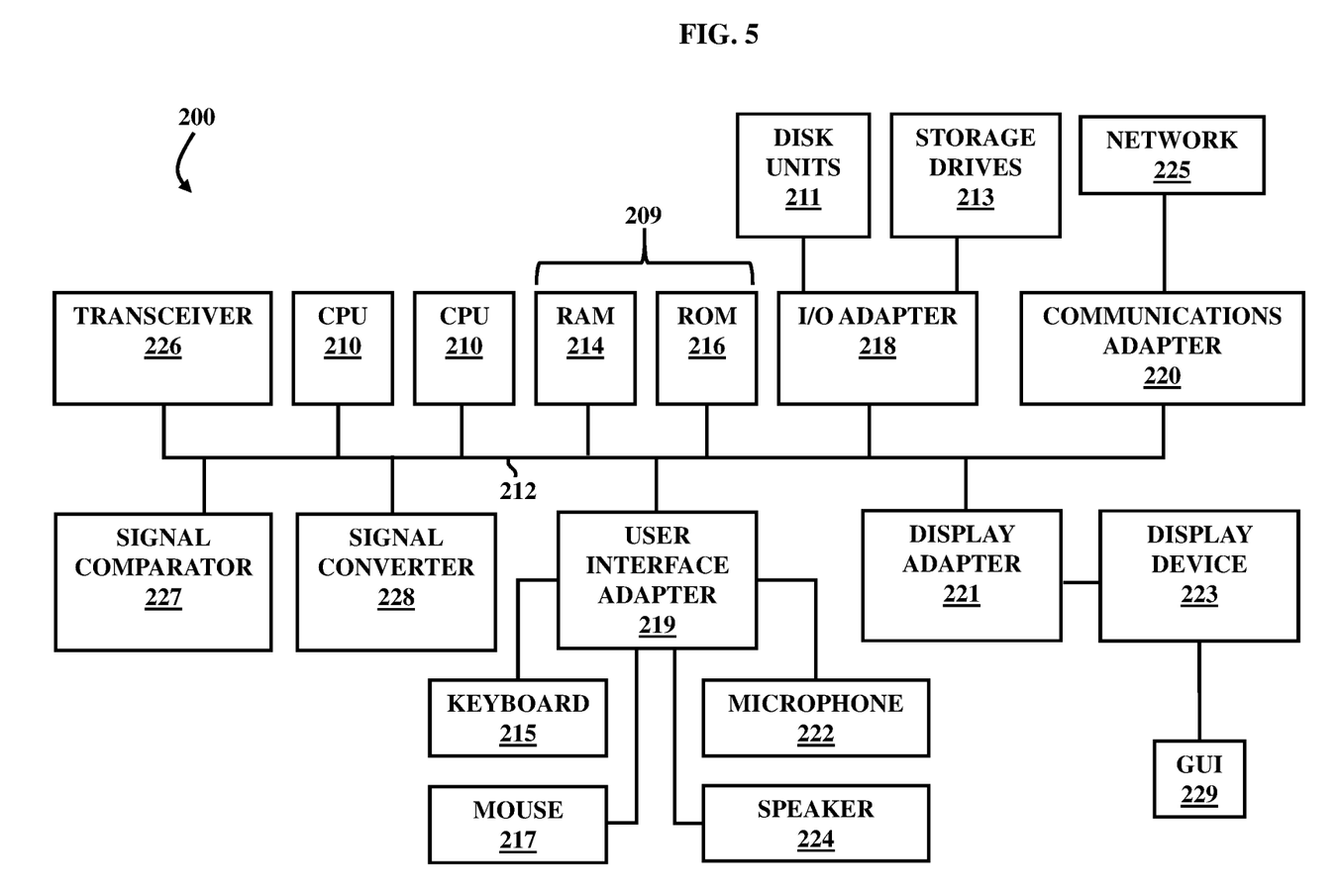
FIG. 5 is a block diagram illustrating a computer system, according to an example herein.

A representative hardware environment for practicing the examples herein is depicted in FIG. 5, with reference to FIGS. 1 through 4. This block diagram illustrates a hardware configuration of an information handling/computer system 200 according to an example herein. The system 200 comprises at least one processor or central processing unit (CPU) 210, which may communicate with processor 56 of printer 50, or in an alternative example, the CPU may be configured as processor 56 of printer 50. The CPUs 210 are interconnected via system bus 212 to at least one memory device 209 such as a RAM 214 and a ROM 216. In one example, the at least one memory device 209 may be configured as the memory device 58 or one of the memory elements $58_1, \ldots, 58_x$ of the memory device 58 of printer 50. The at least one memory device 209 may include local memory employed during actual execution of the program code, bulk storage, and cache memories which provide temporary storage of at least some program code in order to reduce the number of times code must be retrieved from bulk storage during execution.

The code may be set to detect a transition in operation of the printer 50, wherein the change in operation comprises any of a change in printing operations and a change in non-printing mechanism operations of the printer 50. Additionally, the code may be set to determine an amount of power available in the power supply 52 of the printer 50 to allow for correct functioning of the printing operations and non-printing mechanism operations of the printer 50. Moreover, the code may be set to allocate the power available to specified printing operations and non-printing mechanism operations of the printer 50, wherein the specified printing operations are a subset of all printing operations and non-printing mechanism operations of the printer 50. The code may be set to deliver power from the power supply 52 to the specified printing operations and non-printing mechanism operations of the printer 50. The code may also be set to determine whether the specified printing operations and non-printing mechanism operations of the printer 50 are functioning correctly after power has been delivered by the power supply 52 to the specified printing operations and non-printing mechanism operations of the printer 50. Furthermore, the code may be set to determine whether power allocations to the specified printing operations and non-printing mechanism operations of the printer 50 have to be changed based on incorrect functioning of the specified printing operations and non-printing mechanism operations of the printer 50.

In an example, the code is set to reduce the delivery of power from the power supply 52 to the specified printing operations and non-printing mechanism operations of the printer 50 that are functioning correctly. In another example, the code is set to increase the delivery of power from the power supply 52 to the specified printing operations and non-printing mechanism operations of the printer 50 that are not functioning correctly. In an example of machine learning, the code may be set to estimate power requirements for the printing operations and non-printing mechanism operations of the printer 50 based on previous power requirements for the printing operations and non-printing mechanism operations of the printer 50.

In FIG. 5, an I/O adapter 218 may connect to peripheral devices, such as disk units 211 and storage drives 213, or other program storage devices that are readable by the system 200. The system 200 includes a user interface adapter 219 that may connect the bus 212 to a keyboard 215, mouse 217, speaker 224, microphone 222, and/or other user interface devices such as a touch screen device, which may be configured as the user interface mechanism 54*g* of printer 50, to gather user input. Additionally, a communication adapter 220 connects the bus 212 to a data processing network 225, and a display adapter 221 connects the bus 212 to a display device 223, which may provide a graphical user interface (GUI) 229 for a user to interact with. Further, a transceiver 226, a signal comparator 227, and a signal converter 228 may be connected to the bus 212 for processing, transmission, receipt, comparison, and conversion of electric or electronic signals, respectively.

The various examples described herein provide a dynamic power management solution for a printer 50, which allows for the ability to utilize sub-optimal power supply capabilities while still maintaining and delivering a seamless user experience without a noticeable difference in the performance of printer functions.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A method comprising:
    detecting a change in a state of operation of a printing device;
    calculating an amount of power available to operate all functions of the printing device;
    allocating the calculated amount of power available to specified functions of the printing device, wherein the specified functions are a subset of all functions of the printing device;
    delivering the allocated calculated amount of power available to the specified functions;
    determining whether each specified function has failed to operate correctly less or more than a predetermined number of times;
    in response to determining that at least one of the specified functions has failed to operate correctly more than the predetermined number of times, but that at least one other of the specified functions has failed to operate correctly less than the predetermined number of times, reallocating and delivering the calculated amount of power available to the specified functions in a first manner; and
    in response to determining that every specified function has failed to operate correctly more than the predetermined number of times, reallocating and delivering the calculated amount of power available to the specified functions in a second manner different than the first manner.

2. The method of claim 1, wherein reallocating and delivering the calculated amount of the power available to the specified functions in the first manner comprises:
    reducing delivery of power to the at least one other of the specified functions that have failed to operate correctly less than the predetermined number of times; and
    increasing the delivery of power to the at least one of the specified functions that have failed to operate correctly more than the predetermined number of times.

3. The method of claim 1, wherein reallocating and delivering the calculated amount of the power available to the specified functions in the second manner comprises:
    reducing delivery of power to the specified functions that are non-required functions to minimum power requirements thereof; and
    increasing delivery of power to the specified functions that are required.

4. The method of claim 3, wherein each specified function has a minimum functional power requirement and a minimum standby power requirement.

5. The method of claim 1, wherein the specified functions of the printing device comprise any of printing, scanning, copying, faxing, outputting audio, networking of communication links, displaying information on a user interface, charging a universal serial bus (USB) port, capping, wiping, and priming of a print head, and performing print head maintenance.

6. The method of claim 1, wherein reallocating and delivering the calculated amount of power available to the specified functions in the second manner comprises:
    determining a ranking level of importance of every specified function;
    reducing delivery of power to specified functions with a low ranking level of importance; and
    increasing delivery of power to the specified functions with a high ranking level of importance.

7. The method of claim 6, wherein a printing mechanism function of the specific functions of the printing device has a highest ranking level of importance.

8. The method of claim 1, further comprising:
    in response to determining that the specified functions of the printing device operate correctly, determining that a failure has not occurred and maintaining delivery of the allocated calculated amount of power available to the specified functions.

9. The method of claim 3, further comprising:
    determining whether each specified function of the printing device is a non-required function or a required function based on a specific operation of the printing device.

10. A non-transitory computer readable medium comprising code set to:
    detect a transition in operation of a printer, wherein the transition in operation comprises any of a change in printing operations and a change in non-printing mechanism operations of the printer;
    determine an amount of power available in a power supply of the printer to allow for correct functioning of the printing operations and non-printing mechanism operations of the printer;
    allocate the determined amount of power available to specified printing operations and non-printing mechanism operations of the printer, wherein the specified printing operations are a subset of all printing operations and non-printing mechanism operations of the printer;

deliver the allocated determined amount of power available from the power supply to the specified printing operations and non-printing mechanism operations of the printer;

determine whether each specified printing operation and non-printing mechanism has failed to operate correctly less or more than a predetermined number of times;

in response to determining that at least one of the specified printing operations and non-printing mechanisms has failed to operate correctly more than the predetermined number of times, but that at least one other of the specified printing operations and non-printing mechanisms has failed to operate correctly less than the predetermined number of times, reallocate and deliver the determined amount of power available to the specified printing operations and non-printing mechanism operations in a first manner; and in response to determining that every specified printing operation and non-printing mechanism has failed to operate correctly more than the predetermined number of times, reallocate and deliver the determined amount of power available to the specified printing operations and non-printing mechanism operations in a second manner different than the first manner.

11. The non-transitory computer readable medium of claim 10, wherein the code is reallocate the determined amount of power available to the specified printing operations and non-printing mechanisms of the printer in the first manner by:

reducing delivery of a first amount of power of the determined amount of power available to the at least one other of the specified printing operations and non-printing mechanisms that have failed to operate correctly less than the predetermined number of times; and increasing the delivery of a second amount of power of the determined amount of power available to the at least one of the specified printing operations and non-printing mechanisms that have failed to operate correctly more than the predetermined number of times.

12. The non-transitory computer readable medium of claim 10, wherein the code is to reallocate the determined amount of power to the specified printing operations and non-printing mechanisms in the second manner:

reducing delivery of a first amount of power of the determined amount of power available to the specified printing operations and non-printing mechanisms that are non-required to minimum power requirements thereof; and increasing delivery of a second amount of power of the determined amount of power to the specified printing operations and non-printing mechanisms that are required.

13. A printing device comprising:
a power supply;
a plurality of printing device function mechanisms operatively connected to the power supply;
a processor operatively connected to the power supply and the plurality of printing device function mechanisms; and
a memory comprising instructions executable by the processor to:

detect changes in operation between the plurality of printing device function mechanisms;

determine an amount of power available in the power supply to operate all of the plurality of printing device function mechanisms;

allocate the determined amount of power available from the power supply to specified printing device function mechanisms, wherein the specified printing device function mechanisms are a subset of all the plurality of printing device function mechanisms;

deliver the allocated determined amount of power available to the specified printing device function mechanisms;

determine whether each specified printing device function mechanism has failed to operate correctly less or more than a predetermined number of times;

in response to determining that at least one of the specified printing device function mechanisms has failed to operate correctly more than the predetermined number of times, but that at least one other of the specified printing device function mechanisms has failed to operate correctly less than the predetermined number of times, reallocate and deliver the determined amount of power available to the specified printing device function mechanisms in a first manner; and in response to determining that every specified printing device function mechanism has failed to operate correctly more than the predetermined number of times, reallocate and deliver the determined amount of power available to the specified printing device function mechanisms in a second manner different than the first manner.

14. The printing device of claim 13, wherein the instructions cause the processor to reallocate the determined amount of power available to the specified printing device function mechanisms in the first manner by:

reducing delivery of a first amount of power of the determined amount of power available to the at least one other of the specified printing device function mechanisms that have failed to operate correctly less than the predetermined number of times; and increasing delivery of a second amount of power of the determined amount of power available to the at least one of the specified printing device function mechanisms that have failed to operate correctly more than the predetermined number of times.

15. The printing device of claim 13, wherein the instructions cause the processor to reallocate the determined amount of power available to the specified printing device function mechanisms in the second manner by:

reducing delivery of a first amount of power of the determined amount of power available to the specified printing device function mechanisms that are non-required to minimum power requirements thereof; and increasing delivery of a second amount of power of the determined amount of power available to the specified printing device function mechanisms that are required.

16. The printing device of claim 13, wherein the plurality of printing device function mechanisms comprise any of a printing mechanism, a scanning mechanism, a copying mechanism, a faxing mechanism, an audio speaker, a communication network mechanism, a user interface mechanism, a universal serial bus (USB) port, and a print head mechanism.

* * * * *